US007627955B1

(12) United States Patent
Perkey

(10) Patent No.: US 7,627,955 B1
(45) Date of Patent: Dec. 8, 2009

(54) STRINGER GUIDE TEMPLATE

(76) Inventor: Thomas Raymond Perkey, 12008 E. 54th St., Kansas City, MO (US) 64133

( * ) Notice: Subject to any disclaimer, the term of this patent is extended or adjusted under 35 U.S.C. 154(b) by 0 days.

(21) Appl. No.: 12/286,569

(22) Filed: Oct. 1, 2008

(51) Int. Cl.
*B43L 7/027* (2006.01)
*G01B 3/02* (2006.01)

(52) U.S. Cl. .............................. 33/427; 33/562; 33/476

(58) Field of Classification Search ........... 33/419–421, 33/427, 429, 452, 464, 474, 476, 483–485, 33/494, 526, 527, 562, 565, 566, 340, 454, 33/456, 459, 460; 52/182, 183, 191
See application file for complete search history.

(56) References Cited

U.S. PATENT DOCUMENTS

| | | | | | |
|---|---|---|---|---|---|
| 164,008 | A | * | 6/1875 | Kirkpatrick | 33/427 |
| 341,126 | A | * | 5/1886 | Boyer | 33/420 |
| 493,048 | A | * | 3/1893 | Van Alstine | 33/420 |
| 539,534 | A | * | 5/1895 | McKinney | 33/474 |
| 796,030 | A | * | 8/1905 | Baumgartner | 33/420 |
| 858,431 | A | * | 7/1907 | Wiegmann | 33/420 |
| 947,422 | A | * | 1/1910 | Sherry | 33/427 |
| 1,006,815 | A | * | 10/1911 | Wiegman | 33/421 |
| 1,527,647 | A | * | 2/1925 | Heinen | 33/420 |
| 3,478,434 | A | * | 11/1969 | Catalano | 33/418 |
| 4,742,619 | A | * | 5/1988 | Swanson | 33/474 |
| 4,833,791 | A | * | 5/1989 | Campbell | 33/562 |
| 4,882,846 | A | * | 11/1989 | Reed | 33/464 |
| 5,388,340 | A | * | 2/1995 | Marty | 33/421 |
| 5,440,818 | A | * | 8/1995 | Mailhot | 33/452 |
| 5,692,357 | A | * | 12/1997 | McCain | 52/749.1 |
| 5,727,325 | A | * | 3/1998 | Mussell | 33/429 |
| 6,260,283 | B1 | * | 7/2001 | Abernathy et al. | 33/419 |

* cited by examiner

*Primary Examiner*—Amy Cohen Johnson

(57) ABSTRACT

A template guide which performs and simplifies the task of layout for stair stringers. This accomplishment has previously been made by the use of multiple tools including the framing square, multipurpose square, and speed square as well as others. The said template of the present invention features an adjustable riser that can be secured for the exact dimension of any rise calculated to be between 6" and 7¾". The said template is configured as such to accommodate the unskilled craftsman as well as the experienced tradesman.

1 Claim, 4 Drawing Sheets

STRINGER GUIDE TEMPLATE

FIELD OF THE INVENTION

The present invention is a tool with the actual shape and size of a portion of a stair stringer. The present invention also has an adjustable feature, which allows the calculated dimension of rise to be set and secured. The said adjustable feature is adjusted by sliding Part #1 into Part #5, using increments labeled #4 on said present invention. Then secure by tightening Screw #14 to hold Part #1 secure to Part #5. The said present inventions function is to simplify and speed up the process, whereby said stair stringers are layed out ready for cutting to final shape.

BACKGROUND OF THE INVENTION

This present invention is a carpentry tool used for the complete layout of stair stringers. The said tool relates to the performances of other tools such as the L-shaped framing square, multipurpose square, speed square, and various other tools.

DESCRIPTION OF THE PRIOR ART

Various devices have been designed in the past to perform the task of laying out stair stringers, but none are as fast and simple as this present invention.

The L-shaped framing square is the most universally recognized tool for performing this task. When using said tool for layout of stair stringers, its use requires the user to align two marks of measurement, one on each leg of the tool. This is often a somewhat clumsy method of operation, for after one number is aligned and when the other leg is moved to align the second number, it often causes the first leg to shift off position, making it necessary to realign a second and sometimes a third time. The said tool also must be spun multiple directions for final layout marks, which can be confusing to the novice craftsman.

Triangular shaped squares such as U.S. Pat. No. 4,742,619 to Swanson, commonly known as "speed squares", are simply too short for accurate layout increments pertaining to stair stringers.

The multipurpose square U.S. Pat. No. 5,727,325 Barry d Mussell, has the problem of being too short for layouts of stair stringers made to receive 2"×12" treads. It also has an edge on the handle that projects out from the faces of body, making it extremely difficult to get accurate markings needed for said layouts.

From the operational descriptions and drawings of this present invention, it becomes evident that the said invention in the embodiments shown by FIGS. 1-6, that said present invention simplifies, increases speed of layout, and makes a more accurate layout for stair stringers.

BRIEF SUMMARY OF THE INVENTION

Many prior art squares perform a variety of specialized functions, however, none of them are able to execute the process of stair stringer layout as fast and effectively as this present invention.

It is the object of the present invention to overcome the shortcomings of the prior art squares and the more traditional methods of laying out a stair stringer. Whereby, the said present inventions unique shape, which is likened to the actual shape of a stair stringer, gives said present invention a simpler, faster, and more accurate method of layout.

DETAILED DESCRIPTION OF THE INVENTION

Figure 1:
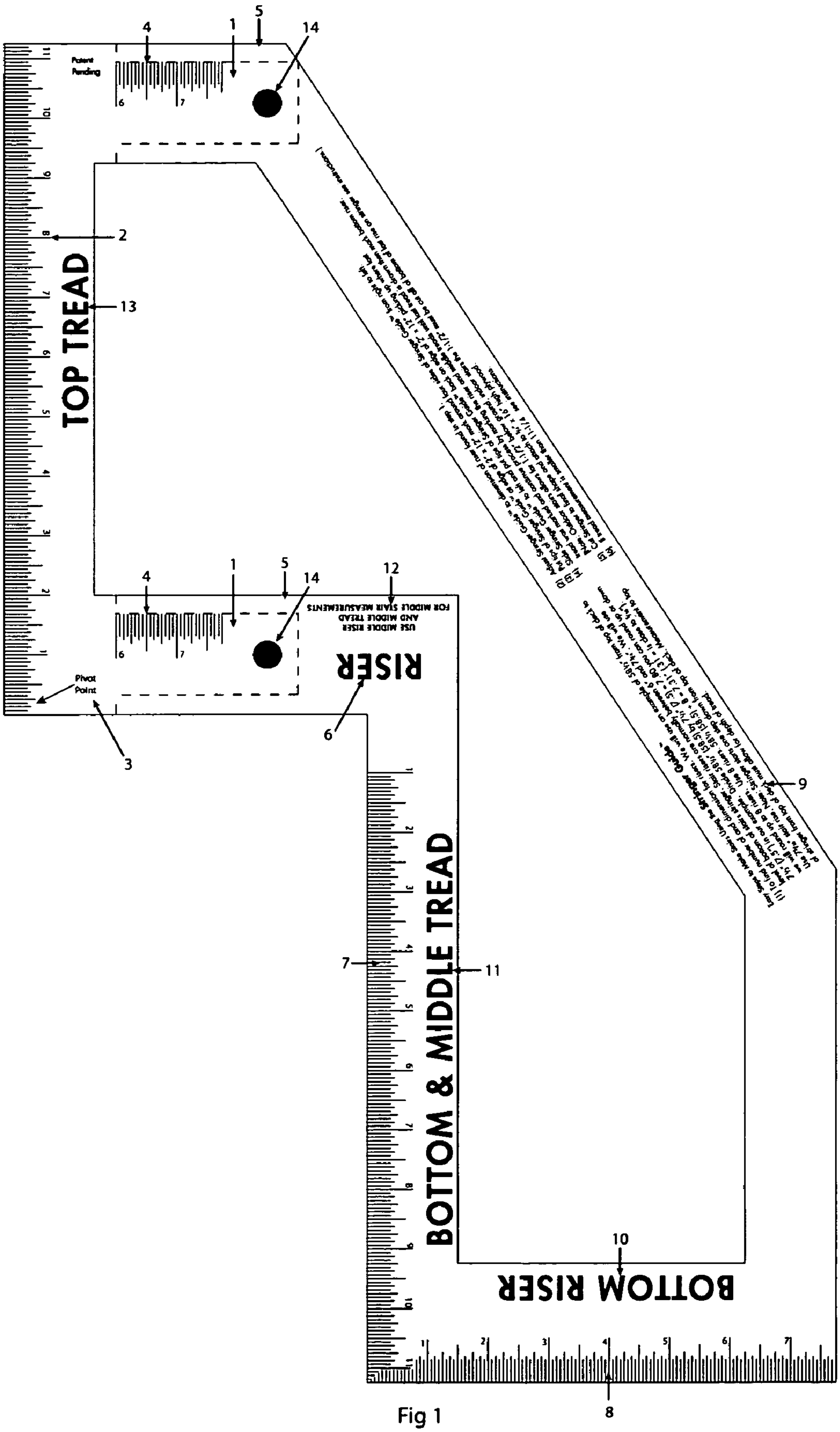
FIG. 1 Shows a face view of one embodiment of the present invention in its closed position.
Figure 2:
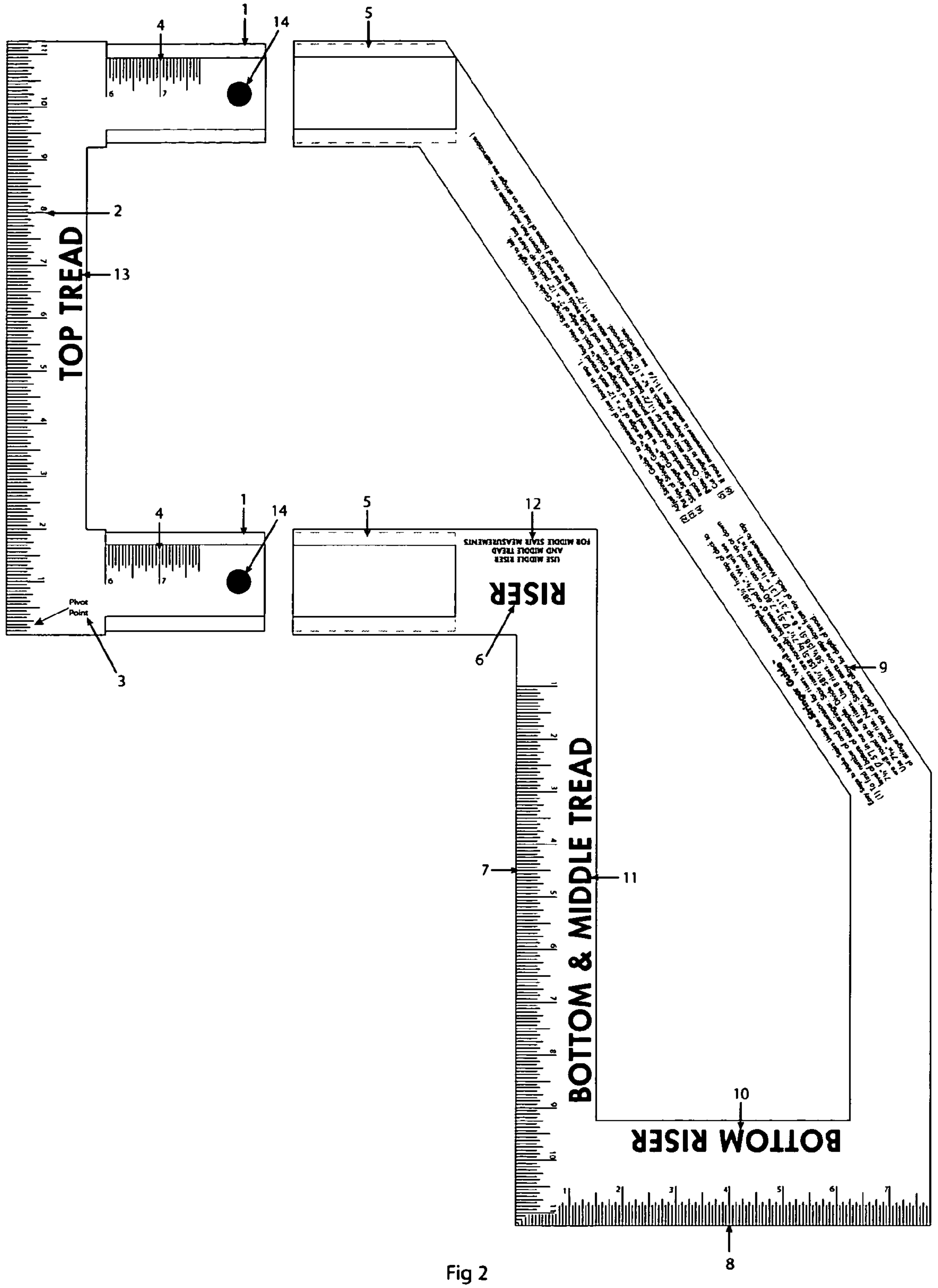
FIG. 2 Shows a face view of the embodiment of FIG. 1 in its opened position.
Figure 3:
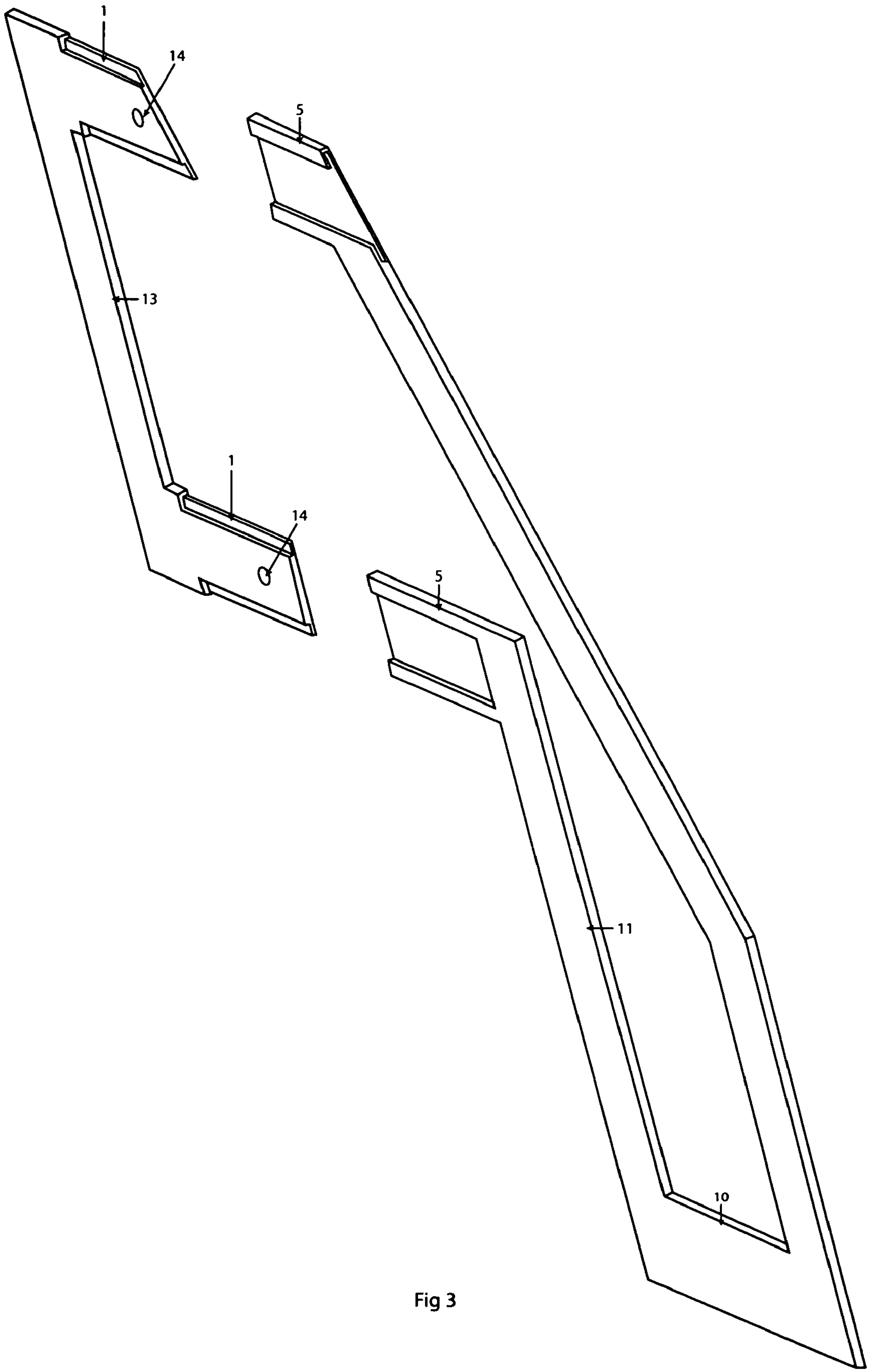
FIG. 3 Is a perspective view of the embodiment of FIG. 2 in it's opened position.

A template guide 1A, one embodiment of the present invention is illustrated in FIG. 1 (a closed face view), FIG. 2 (an opened face view), and FIG. 3 (a perspective view). This tool may be fabricated of any suitable material, but is to be commonly made of either aluminum or injected mold plastic. The said template is labeled on one side, only, so user will not be confused by reversing said tool.

Figure 4:
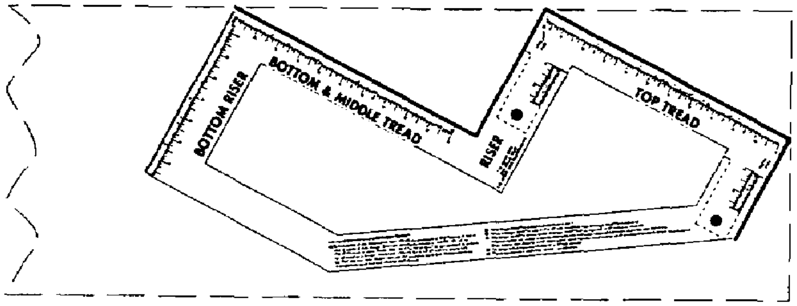
FIG. 4 Illustrates the embodiment of FIG. 1 being used to layout the top step of stair stringer, then continuing on, marking the beginning of middle steps.
Figure 5:
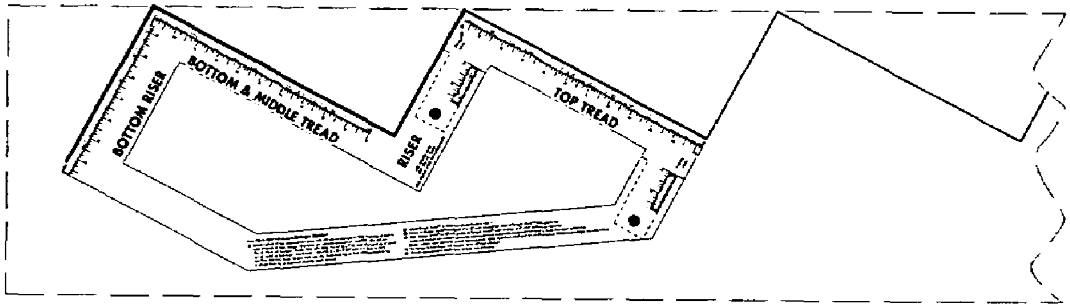
FIG. 5 Illustrates the embodiment of FIG. 1 being used to layout the continuation of said middle steps of said stair stringer.
Figure 6:
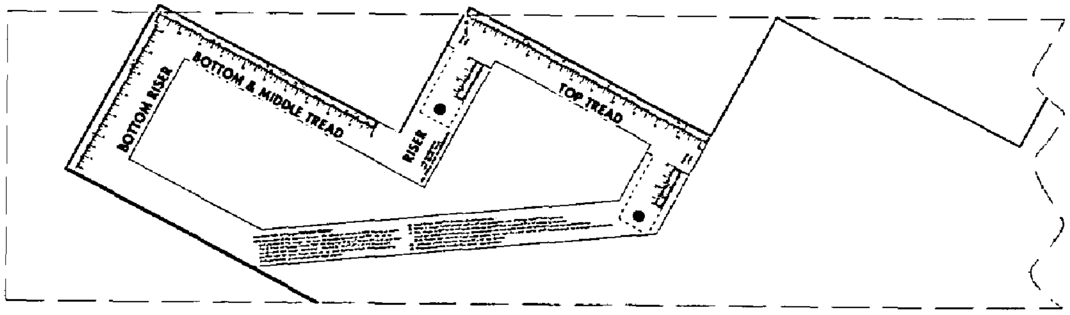
FIG. 6 Illustrates the embodiment of FIG. 1 being used to mark final layout of bottom step of said stair stringer.

FIG. 1 shows a template with stair stepped body so user can visualize the actual look of finished stair stringer. FIG. 2, an embodiment of FIG. 1, shows said template in its opened position, thus allowing the user to recognize the adjustable feature of the said template. Once the rise of stairs has been determined the square can then be fixed to that dimension, creating the previous drawing in FIG. 1 to be accurate. FIG. 3, an embodiment of FIG. 1, shows a perspective view of the said present invention, giving the viewer an opportunity to see an angle of how part #1 will slide into part #5. The said tool as illustrated in FIG. 4 can be placed on the desired dimensional lumber at the right end of material. The tips of the said template are to be placed flush with the edge of board, then marking around four sides of said template can be drawn, starting from right to left. FIG. 5 an embodiment of FIG. 1 shows the method of sliding said template from right to left, replacing tips of said template back on same edge of said material for marking of middle steps. FIG. 6 an embodiment of FIG. 1 shows the method of sliding the said template from right to left and replacing the tips of said template on same edge of lumber for final marking of the bottom step.

(Note: outdoor stairs allow for stair stringer to be 1½" below ground, indoor stairs, the 1½", must be subtracted from actual height dimension of bottom riser and marked accordingly for final level mark, at bottom of said stair stringer). Once this final layout is completed, said stair stringers are ready to be cut to final shape.

This present invention can be either laser cut out of various materials, such as, aluminum, steel, etc. or made by injecting plastic into an injection mold.

The right and left male tongues, a part of the present invention, protrude from the end of the smaller section of two sections that form the present invention. Labeled #1 on the drawings 1-6.

The increments for top tread allow user to identify measurements on said tread. Labeled #2 on drawings 1-6.

The pivot point located on left ty's of the smaller section may be positioned on top edge of material. Then by rotating the present invention upward from the left side of the present invention, while holding the said pivot point, securing a new measurement for tread may be established if user desires the tread of stringer measurement be less than 11¼ inches. Labeled #3 on drawings 1-6.

The increments for adjusting rise are measurements allowing rise to be established between 6 inches and 7¾ inches. Labeled #4 on drawings 1-6.

The right and left sleeves are grooved recipients located at end of larger section of present invention and are imperative parts for joining of present invention. Labeled #5 on drawings 1-6.

The riser indications are labels to indicate the rise of stair stringer. Labeled # 6 on drawings 1-6.

Increments for bottom and middle treads allow user to identify measurements on middle or bottom treads. Labeled #7 on drawings 1-6.

Increments for bottom riser are measurements so user can mark proper height of bottom riser of stair stringer. Labeled #8 on drawings 1-6.

Instructions are a step by step method for use of present invention. Labeled #9 on drawings 1-6.

Label for bottom riser indicates the bottom rise of stair stringer. Labeled #10 on drawings 1-6.

Label for bottom and middle tread identifies one part of present invention. Labeled #11 on drawings 1-6.

Instruction for use of middle riser indicates this portion of stair stringers are continued down length of material. Labeled #12 on drawings 1-6.

Label for top tread signifies to user the first step of stair stringer. Labeled #13 on drawings 1-6.

Set screw for securing tongue to sleeve at desired dimension of stair stringer. Labeled #14 on drawings 1-6.

What is claimed is:

1. An adjustable stringer guide template comprising:

a first section slidably connected to a second section;

wherein said first section comprises a U-shaped member having first and second parallel legs and a perpendicular leg connecting the first and second parallel legs;

wherein said second section comprises third and fourth parallel legs which slidably engage the first and second parallel legs of the first section, respectively; a fifth leg extending perpendicularly from the third parallel leg and away from the fourth parallel leg; a sixth leg extending perpendicularly from the fifth leg and parallel to the third leg; a seventh leg extending perpendicularly from the sixth leg and parallel to the fifth leg; and an angled member extending angularly from the fourth parallel leg of the second section and connected to the seventh leg;

wherein said first leg, second leg, and sixth leg, include riser indicia thereon and said perpendicular leg of said first section and said fifth leg include tread indicia thereon;

whereby sliding the first section relative to the second section adjusts the adjustable stringer guide template to a desired riser dimension of a stringer for a staircase.

* * * * *